United States Patent
Noda et al.

(10) Patent No.: US 6,290,626 B1
(45) Date of Patent: Sep. 18, 2001

(54) CONTROLLER FOR USE WITH AUTOMATIC TRANSMISSION PROVIDED WITH LOCKUP MECHANISM AND MEMORY MEDIUM STORING METHOD FOR CONTROL OF AUTOMATIC TRANSMISSION

(75) Inventors: Junichi Noda, Ibaraki-ken; Hiroshi Kuroiwa, Hitachi, both of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/444,564

(22) Filed: Nov. 19, 1999

(30) Foreign Application Priority Data

Nov. 19, 1998 (JP) .................................................. 10-329403

(51) Int. Cl.$^7$ .................................................. B60K 41/02
(52) U.S. Cl. ........................ 477/169; 477/174; 192/3.28
(58) Field of Search .................................... 477/169, 174, 477/176; 192/3.28, 3.29

(56) References Cited

U.S. PATENT DOCUMENTS 5,318,159 * 6/1994 Kashiwabara .......................... 477/169
5,911,647 * 6/1999 Kozaki et al. .......................... 477/143

FOREIGN PATENT DOCUMENTS

| 3-260466 | 11/1991 | (JP) . |
| 4-175571 | 6/1992 | (JP) . |
| 7-198034 | 8/1995 | (JP) . |
| 8-135787 | 8/1996 | (JP) . |

* cited by examiner

Primary Examiner—Sherry Estremsky
Assistant Examiner—Tisha D. Lewis
(74) Attorney, Agent, or Firm—Crowell & Moring LLP

(57) ABSTRACT

In an apparatus for controlling an automatic transmission which is provided with a torque converter having a fluid coupling unit for coupling driving force to a transmission through fluid coupling and a direct coupling unit for coupling the driving force to the transmission through mechanical coupling and being operative to take a fluid coupling state, a direct coupling state or an intermediate state between the fluid and direct coupling states in accordance with a working pressure applied to the direct coupling unit, a control signal is generated for changing the initial value of the working pressure in accordance with the driving force during the period of transition between the fluid coupling state and the direct coupling state.

11 Claims, 11 Drawing Sheets

CONTROLLER FOR USE WITH AUTOMATIC TRANSMISSION PROVIDED WITH LOCKUP MECHANISM AND MEMORY MEDIUM STORING METHOD FOR CONTROL OF AUTOMATIC TRANSMISSION

BACKGROUND OF THE INVENTION

The present invention relates to a controller for use with an automatic transmission used in a power transmission mechanism in which driving force of a vehicle engine is converted for transmission to wheel shafts by means of the automatic transmission and more particularly, to an automatic transmission controller suitable for use with an automatic transmission provided with a direct coupling mechanism which mechanically transmits driving force of the engine to a transmission.

Some types of automatic transmission for vehicles using a torque converter adapted to transmit or couple driving force through the medium of fluid are provided with a lockup mechanism which transmits the driving force by mechanically coupling the engine output to the transmission without resort to intervention of fluid in order to improve fuel economy. In the lockup mechanism, the engine is directly coupled to the transmission by press force of clutch controlled by a working pressure. A halfway clutching state can be allowed by adjusting the working pressure on the clutch. Typically, with the aim of preventing a large shock from being generated owing to abrupt engagement of the clutch during a shift from fluid coupling state to direct coupling state, the working pressure is gradually increased to suppress the shock. Similarly, during a shift from direct coupling state to fluid coupling state, the working pressure is gradually decreased to relieve a shock.

In a conventional automatic transmission provided with the lockup mechanism, the initial value of working pressure during the shift from fluid coupling state to direct coupling state or vice versa is always kept to be constant regardless of various running conditions. Further, in the course of the shift between the direct coupling state and the fluid coupling state, the increasing and decreasing rates of the working pressure are constant.

JP-A-11-37279 discloses control of an automatic transmission having a continuously variable transmission and a lockup mechanism in combination. In the control described in this literature, the lockup state is released forcibly when the load decreases abruptly during the lockup. JP-A-4-175571 discloses that coupling force of a lockup clutch is so controlled as to be increased gradually. JP-A-3-260466 and JP-A-7-198034 disclose that coupling force is feedback-controlled such that a lockup clutch is brought into a slip state.

SUMMARY OF THE INVENTION

According to studies of the inventors of the present invention, it has been found that a working pressure necessary for engagement of a lockup clutch is liable to decrease when input torque (driving force) from the engine to the torque converter is small and conversely, a working pressure of the clutch necessary for lockup liable to increase as the input torque increases. Similarly, it has been found that during relief of the lockup clutch, a working pressure for relieving the lockup clutch is liable to decrease when the input torque is small and conversely, a working pressure necessary for relieving the lockup clutch is liable to increase as the input torque increases.

Accordingly, with the initial value of working pressure rendered to be constant and the increasing rate also rendered to be constant during the shift from the fluid coupling state to the direct coupling state as in the case of the conventional automatic transmission controller, the time ranging over the start of state shift and the completion of engagement is shortened when the input torque is small but is prolonged when the input torque is large. A similar phenomenon takes place during the shift from the direct coupling state to the fluid coupling state.

When the lockup time changes with the magnitude of the input torque, a problem is found to arise in which the driver has a large disordered feeling of immaturity of lockup or abnormally rapid maturity of lockup in contrast to natural maturity of the lockup.

Further, for example, under the condition that the input torque is small and the lockup is set up or established, much time is required for relieving the lockup clutch and therefore, an engine stall will take place when the driver applies abrupt braking or quick service.

Conceivably, measures may be taken to cope with the problems as above by increasing and decreasing rates of the working pressure during the state transition period. With the above countermeasures, however, the time for lockup engagement or relief is shortened when the input torque is large and a shock due to abrupt lockup engagement or relief increases, thus giving an uncomfortable feeling to the driver.

Moreover, in case the time for engagement of the lockup clutch is prolonged unnecessarily, the fuel economy is degraded.

According to the invention, in a control for use with an automatic transmission which is provided with a torque converter having a fluid coupling unit for coupling driving force to a transmission through fluid coupling and a direct coupling unit for coupling the driving force to the speed change gear through mechanical coupling and being operative to take a fluid coupling state, a direct coupling state or an intermediate state between the fluid and direct coupling states in accordance with a working pressure applied to the direct coupling unit, the controller comprises a working pressure controller for generating a control signal which changes the initial value of the working pressure in accordance with the driving force during the period of transition between the fluid coupling state and the direct coupling state.

According to the automatic transmission controller of the present invention, the period of transition between the fluid coupling state set up by the fluid coupling unit and the lockup state set up by the direct coupling unit, such as a lockup clutch, in the torque converter can extend for a proper time regardless of input torque and a shock during lockup clutch engagement or relief can be reduced to thereby improve the drivability.

Further, according to the invention, in a memory medium readable by a computer and storing a program for execution of a method of controlling an automatic transmission which is provided with a torque converter having a fluid coupling unit for coupling driving force to a transmission through fluid coupling and a direct coupling unit for coupling the driving force to the speed change gear through mechanical coupling and being operative to take a fluid coupling state, a direct coupling state or an intermediate state between the fluid and direct coupling states in accordance with a working pressure applied to the direct coupling unit, the program has a step of generating a control signal which changes the initial value of the working pressure in accordance with the driving force during the period of transition between the fluid coupling state and the direct coupling state.

DESCRIPTION OF THE EMBODIMENTS

Referring now to FIGS. 1 to 9, construction and operation of an automatic transmission controller according to an embodiment of the present invention will be described.

Figure 1:
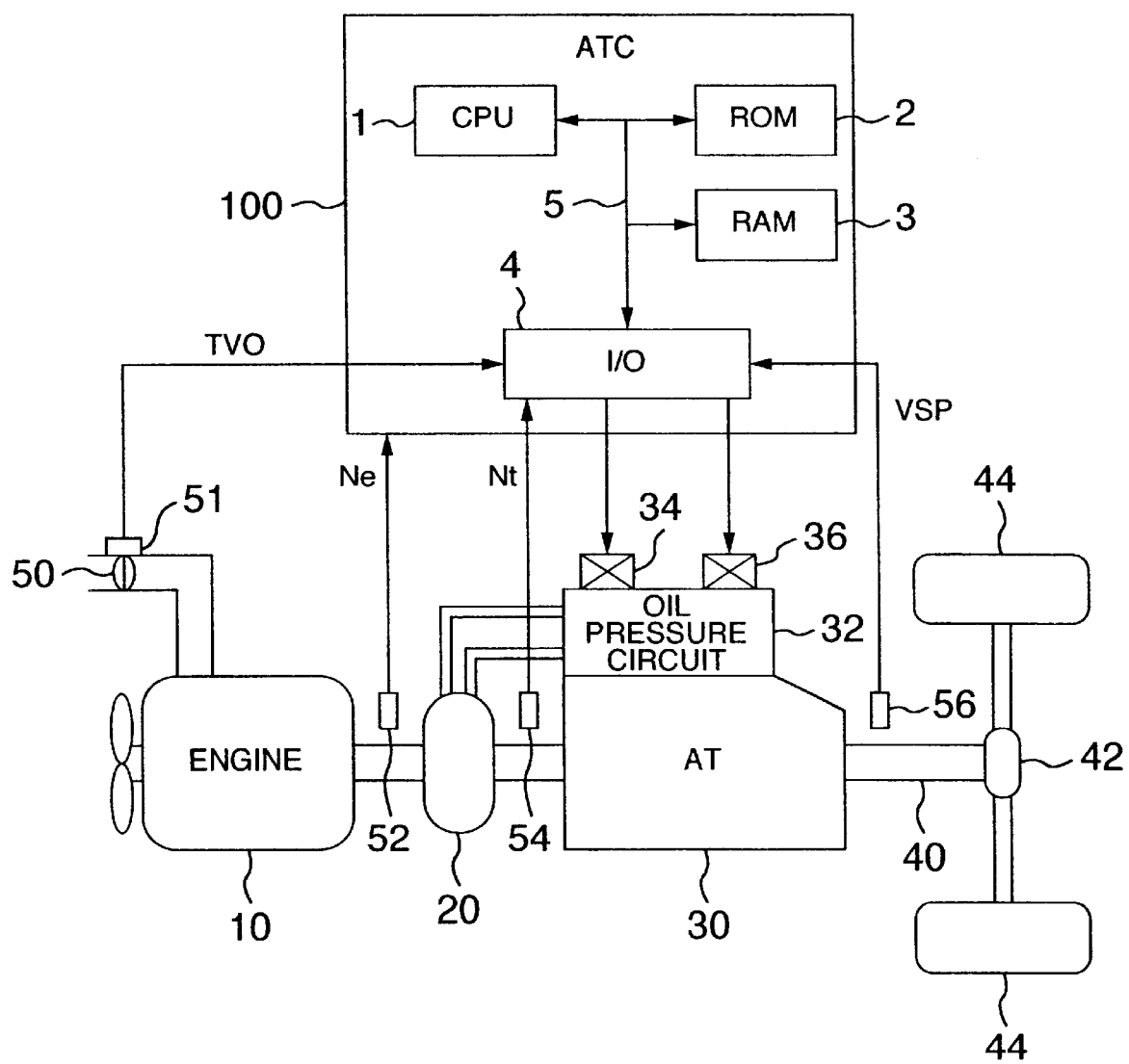
FIG. 1 is a diagram showing the construction of a system of a car provided with an automatic transmission controller according to an embodiment of the present invention.

Firstly, the overall construction of a control system of the automatic transmission according to the present embodiment will be described with reference to FIG. 1.

Driving force delivered out of an engine 10 is transmitted or coupled to an automatic transmission (hereinafter referred to as "AT") 30 through a torque converter 20. The torque converter 20 includes a fluid coupling unit for coupling the driving force through the medium of fluid. The torque converter 20 further includes a lockup mechanism (lockup clutch) serving as a direct coupling unit for mechanical direct transmission or coupling of the driving force without resort to intervention of fluid. An output of the AT 30 is transmitted or coupled to driving wheels 44 through a propeller shaft 40 and a differential unit 42.

An oil pressure circuit generates oil pressures necessary to control the AT 30 and the torque converter 20. A lockup solenoid 34 is continuously controllable between engaging and disengaging states of lockup clutch by a duty ratio or a current value in order to control engagement and relief of the lockup clutch. A shift solenoid 36 controls the gear ratio of the AT 30.

Supplied to an automatic transmission controller (hereinafter referred to as ATC) 100 associated with the AT are detection signals of a throttle opening sensor 51 for detecting the opening of a throttle valve 50, an engine rotation sensor 52 for fetching the engine speed, a turbine rotation speed sensor 54 for fetching the rotation speed inputted to the AT 30, and a vehicle speed sensor 56 adapted to determine the vehicle speed by fetching the rotation speed of the propeller shaft 40. The ATC 100 fetches a throttle opening TVO from the throttle opening sensor 51, an engine speed Ne from the engine speed sensor 52, a turbine rotation speed Nt from the turbine rotation speed sensor 54 and a vehicle speed VSP from the vehicle speed sensor 56 and operates them to decide on the basis of results of the operation whether the lockup clutch is to be engaged or relieved and besides to determine a working pressure of the lockup clutch.

Especially, on the basis of the vehicle signal VSP and the throttle opening signal TVO and pursuant to a predetermined transmission shift program, the ATC 100 decides whether the torque converter 20 operates in a lockup region or a fluid coupling region. When determining a shift from the fluid coupling region to the lockup (direct coupling) region, the ATC 100 generates a lockup command. When determining a shift from the lockup region to the fluid coupling region, the ATC 100 generates a lockup relief command. During the period of transition between the fluid coupling region and the lockup (direct coupling) region, the working pressure of the lockup clutch is controlled.

In response to the lockup command, control of the period of transition from the fluid coupling region to the lockup region is executed. In response to the lockup relief command, control of the period of transition of from the lockup region to the fluid coupling region is executed. The working pressure of the lockup clutch is controlled by using a control signal applied to the lockup solenoid 34. Further, on the basis of the aforementioned various input parameter signals, the ATC 100 determines an optimum gear ratio and delivers a signal for selection of the optimum gear ratio to the shift solenoid 36.

The ACT 100 can be realized with a general microcomputer having a CPU 1, a ROM 2, a RAM 3, an input/output unit 4 and a bus 5 for mutually coupling these components. The CPU 1 generates a control signal for the working pressure in accordance with a control program for lockup clutch working pressure data stored in the ROM 2 and various pieces of constant data and delivers the control signal to the solenoid 34 via the input/output unit 4. Data and instructions necessary for control are temporarily stored in the RAM 3. The control program for execution of control in the present invention may be stored in the ROM 2 in advance or alternatively, may be down-loaded onto the ATC 100 from a different memory unit (not shown) or externally of the ATC via a communication system. A recording medium for storage of the control program may typically be a semiconductor memory such as ROM but in alternative, it may be an optical disc, a magnetic disc or a memory unit of other type.

Figure 2:
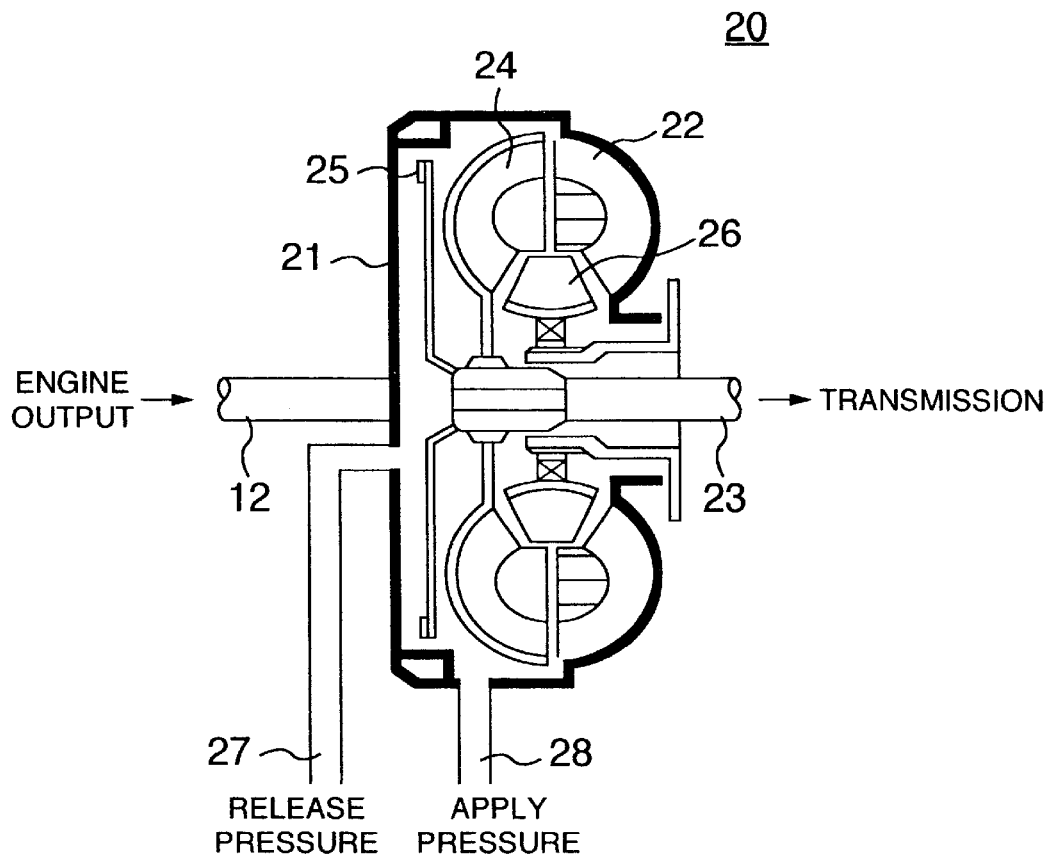
FIG. 2 is a sectional view showing the construction of a torque converter used in the embodiment of the automatic transmission controller.

Turning now to FIG. 2, the construction of the torque converter 20 used for the embodiment of the automatic transmission controller will be described. In this example, the construction of a torque converter having the most typical lockup mechanism is schematically illustrated.

The torque converter 20 includes a torque converter cover 21 fixedly connected to an engine output shaft 12, a pump impeller 22 connected to the torque converter cover 21, a stator 26 connected to a non-rotary member by way of a oneway clutch, an input shaft 23 for transmission of rotation to the AT 30, a turbine runner 24 fixedly connected to the input shaft 23, and a lockup clutch 25 similarly secured to the input shaft 23.

Oil is supplied from a release pressure supply pipe 27 to a space between lockup clutch 25 and torque converter cover 21, thereby providing a release pressure necessary for separation of connection between the lockup clutch 21 and the torque converter cover 21. An apply pressure necessary to press the lockup clutch 25 on the torque converter cover 21 is supplied from an apply pressure supply tube 28 so as to bring the lockup clutch into engagement with the torque converter cover. In control operation carried out with the oil pressure system as above, the lockup clutch 25 can be controlled by a difference pressure between the apply pressure and the release pressure, that is, (apply pressure−release pressure). This difference pressure corresponds to the working pressure. Used as the supply pressure is a pilot pressure obtained by controlling a base pressure generated by an oil pressure pump (not shown) driven by the engine to a constant pressure by means of the oil pressure circuit 32. The pilot pressure slightly changes with the engine rotation but the lockup clutch 25 controlled by the difference pressure is less affected by this change.

Next, transmission or coupling of driving force (torque) by the torque converter 20 will be described.

When a lockup relief command is delivered from the ATC 100 to the lockup solenoid 34, the release pressure is supplied from the oil pressure circuit 32 while the apply pressure being removed. As a result, torque transmission between the lockup clutch 25 and the torque converter cover 21 is interrupted. Accordingly, under this condition, torque is transmitted through fluid coupling as below. Namely, an engine rotation is transmitted by means of the torque converter cover 21 secured to the engine output shaft 12, with the result that the pump impeller 22 is rotated and oil filled therein is moved. Resulting flow of the moved oil transmits torque to the turbine runner 24. Subsequently, the oil running through the turbine runner 24 impinges upon the stator 26 and a reaction force generated during the impingement amplifies the torque to be transmitted to the turbine runner 24.

Subsequently, when a lockup command is delivered from the ATC 100 to the lockup solenoid 34, the release pressure is removed by means of the oil pressure circuit 32 and the apply pressure is supplied. As a result, the lockup clutch 25 engages the torque converter cover 21 to permit torque to be transmitted directly. In this case, the engine torque is transmitted without alteration and the torque amplifying effect does not take place.

Figure 3:
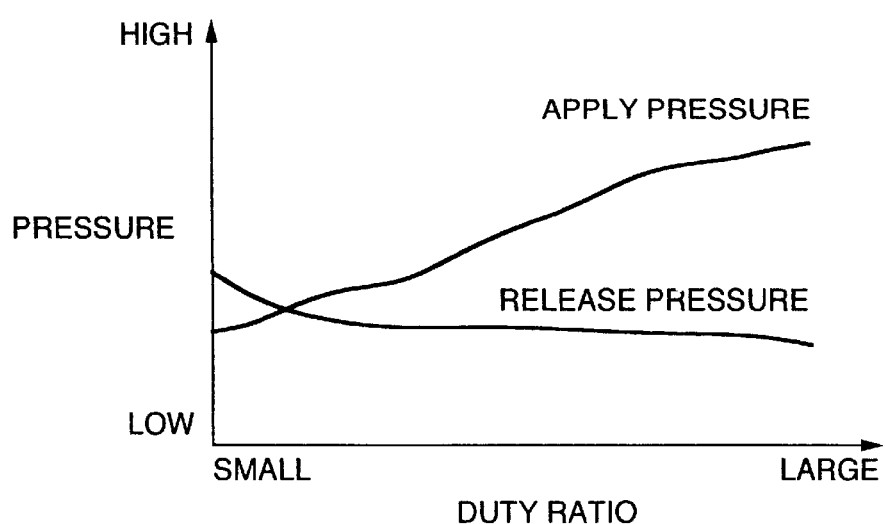
FIG. 3 is a graphic representation useful to explain the relation between a command value from the automatic transmission controller (ATC) to a lockup solenoid and apply/release pressure in the embodiment.

Referring to FIG. 3, the relation between the command value from the ATC 100 to the lockup solenoid 34 and each of the apply pressure and the release pressure will be described.

In the figure, the command value from the ATC 100 is exemplified as a duty output which repeats electrical ON/OFF at a constant period. In this case, the lockup solenoid 34 is a duty-controlled solenoid.

As shown in FIG. 3, as the duty ratio increases, the apply pressure increases and the release pressure decreases. Accordingly, the difference pressure can be changed continuously by changing the duty ratio. In place of the control operation based on the duty ratio, a control operation using a linear solenoid or a step motor controllable by current value can also be used.

Figure 4:
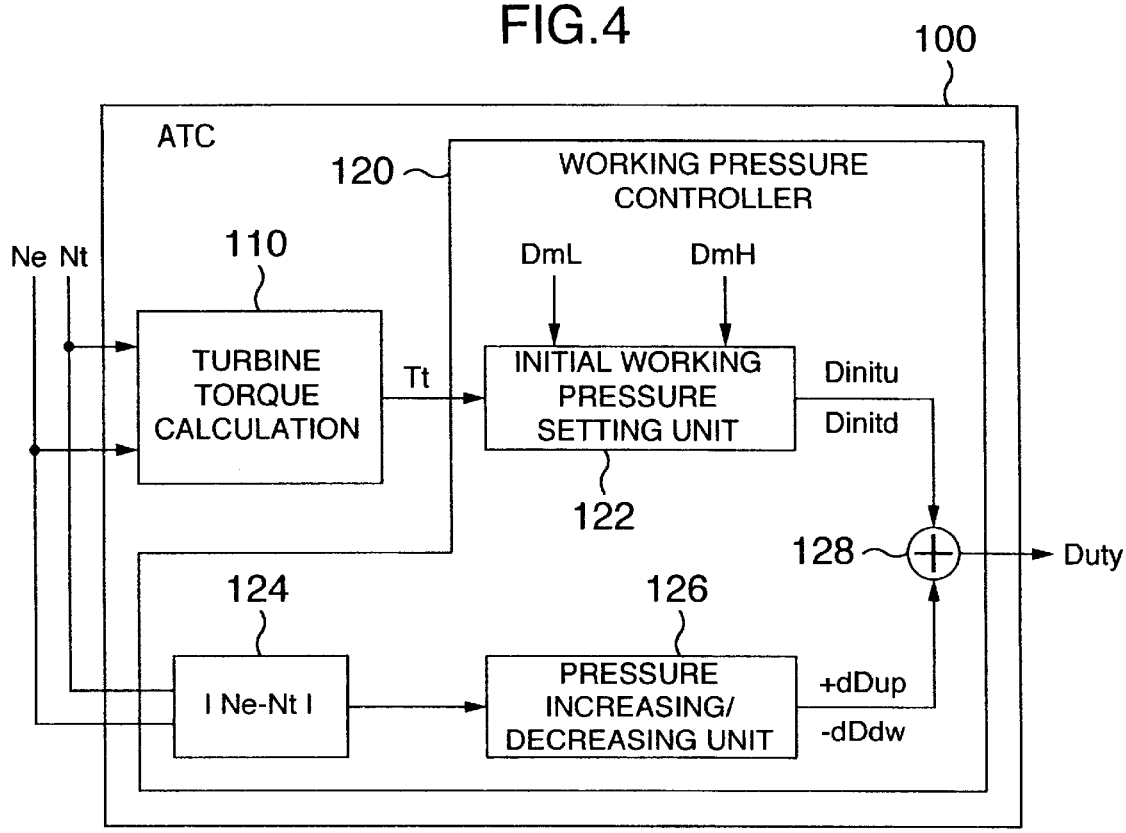
FIG. 4 is a block diagram showing the construction of the ATC in the embodiment.

Next, the construction of the ATC 100 for use with the automatic transmission in the present embodiment will be described with reference to a block diagram of FIG. 4.

In the present embodiment, the ATC 100 includes a turbine torque calculator 110 and a working pressure controller 120. The turbine torque calculator 110 responds to a signal of engine speed Ne detected by the engine speed sensor 52 and a signal of turbine speed Nt detected by the turbine speed sensor 54 and inputted to the AT 30 to calculate turbine torque Tt. The turbine torque calculator 110 is constructed as will be described later with reference to FIG. 5.

The working pressure controller 120 responds to the turbine torque Tt calculated by the turbine torque calculator 110, the engine speed Ne and the turbine speed Nt to calculate a command value Duty for the working pressure. The operation of the controller 120 will be detailed later with reference to FIGS. 6 to 9. The working pressure controller 120 includes an initial working pressure setting unit 122, a rotation speed difference calculating unit 124 and a working pressure increasing/decreasing unit 126. The initial working pressure setting unit 122 sets the initial value of working pressure on the basis of the turbine torque Tt calculated by the turbine torque calculator 110. A first feature of the present embodiment resides in that the initial value of working pressure is changed in accordance with the value of turbine torque Tt. The rotation speed difference calculating unit 124 calculates an absolute value |Ne−Nt| of the difference between engine rotation speed Ne and turbine speed Nt. The working pressure increasing/decreasing unit 126 increases/decreases the working pressure on the basis of the rotation speed difference |Ne−Nt| and for example, in the course of pressure increase, it carries out switching between two levels of different increasing rates on the way. Similarly, in the course of pressure decrease, switching between two levels of different decreasing rates is carried out on the way. A second feature of the present embodiment resides in that the working pressure increasing rate or decreasing rate is changed on the way.

The function of each of the turbine torque calculator 110 and the working pressure controller 120 is executed by the CPU 1 in accordance with a computer program. Part of the function, however, may be realized with a hardware circuit.

Figure 5:
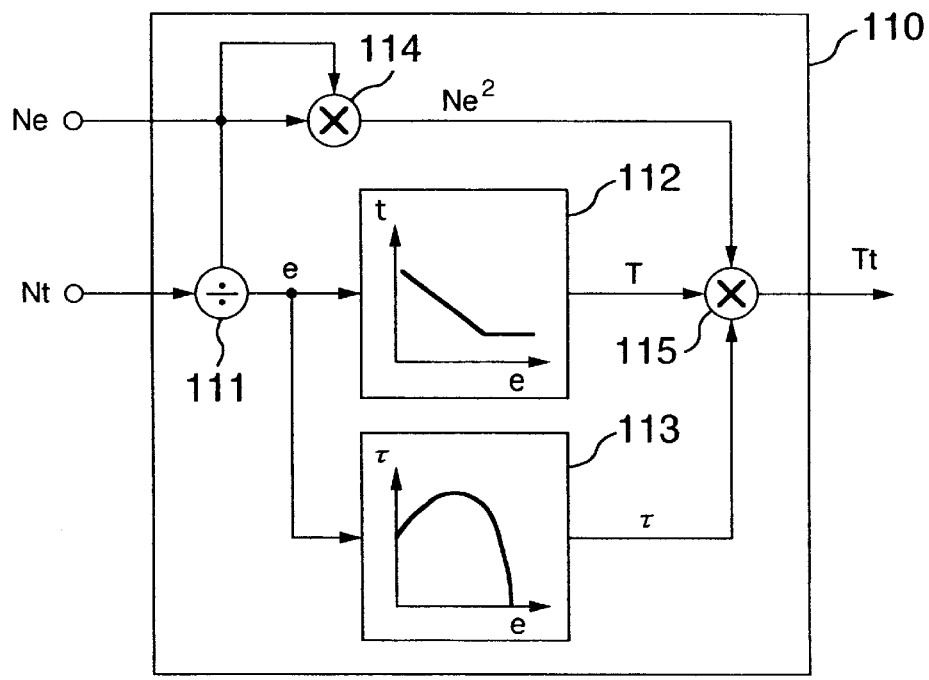
FIG. 5 is a block diagram showing the construction of a turbine torque calculator used in the embodiment.

Next, the construction of the turbine torque calculator 110 used in the automatic transmission controller in the present embodiment will be described with reference to a block diagram of FIG. 5.

A dividing unit 111 of the turbine torque calculator 110 divides the turbine speed Nt by the engine speed Ne to obtain a slip ratio e of the torque converter 20. A torque ratio calculating unit 112 determines a torque ratio t from a precedently stored torque ratio characteristic of the torque converter 20. A pump capacity coefficient calculating unit 113 determines a pump capacity coefficient τ from a precedently stored pump capacity characteristic of the torque converter 20. A multiplying unit 114 determines the square of engine speed Ne. A multiplying unit 115 multiplies the square of Ne by the torque ratio t and the pump capacity coefficient τ to calculate turbine torque Tt.

Referring now to FIGS. 6 to 9, the operation of the working pressure controller 120 used in the automatic transmission controller in the present embodiment will be described in greater detail.

Firstly, the operation of the working pressure controller 120 during shift control from the fluid coupling state to the lockup state (hereinafter referred to as lockup OFF-ON) will be described with reference to FIGS. 6 and 7.

Figure 6:
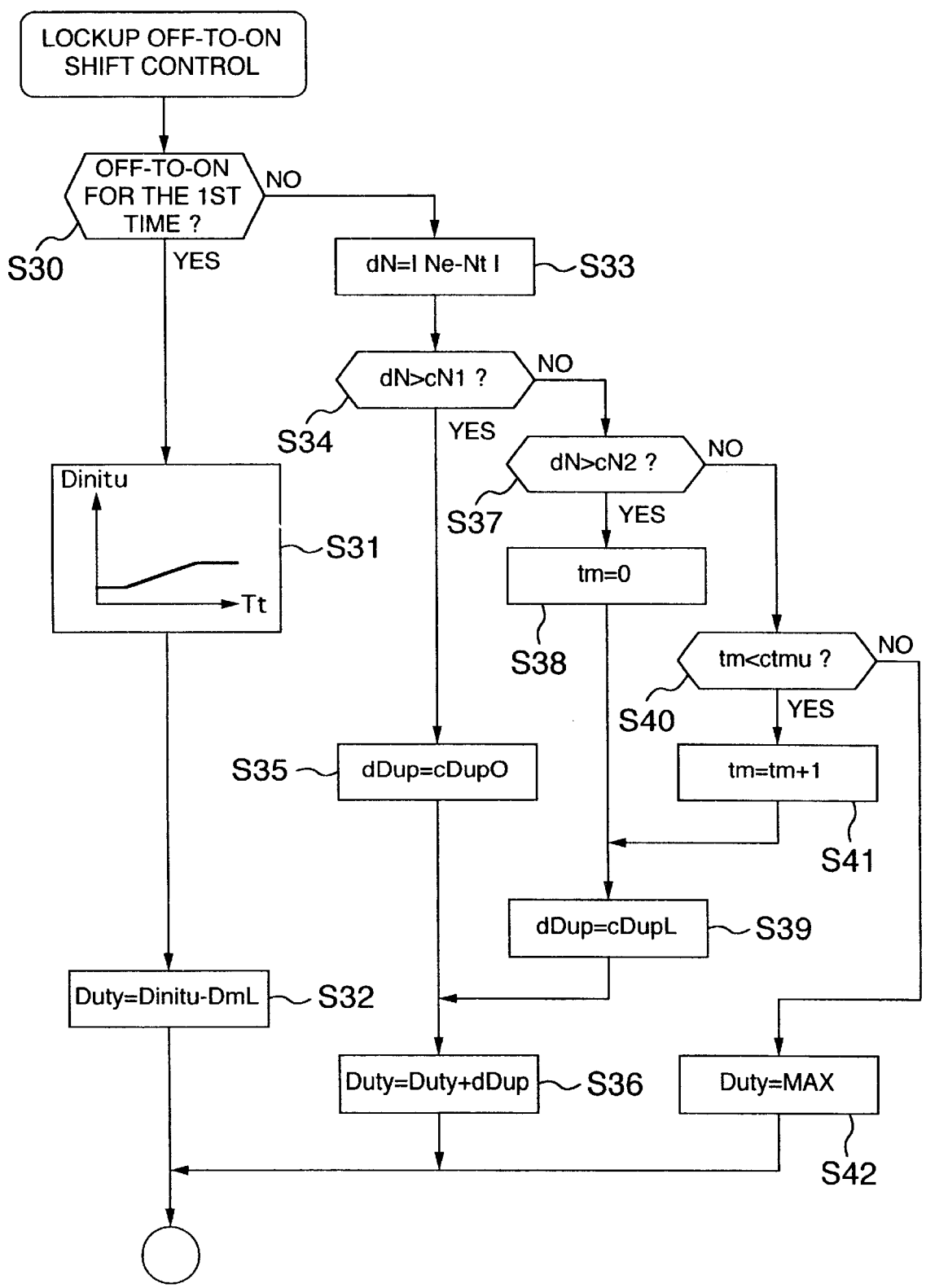
FIG. 6 is a flow chart showing an embodiment of operation during lockup OFF-ON shift control of a working pressure controller used in the embodiment of the automatic transmission controller.
Figure 7:
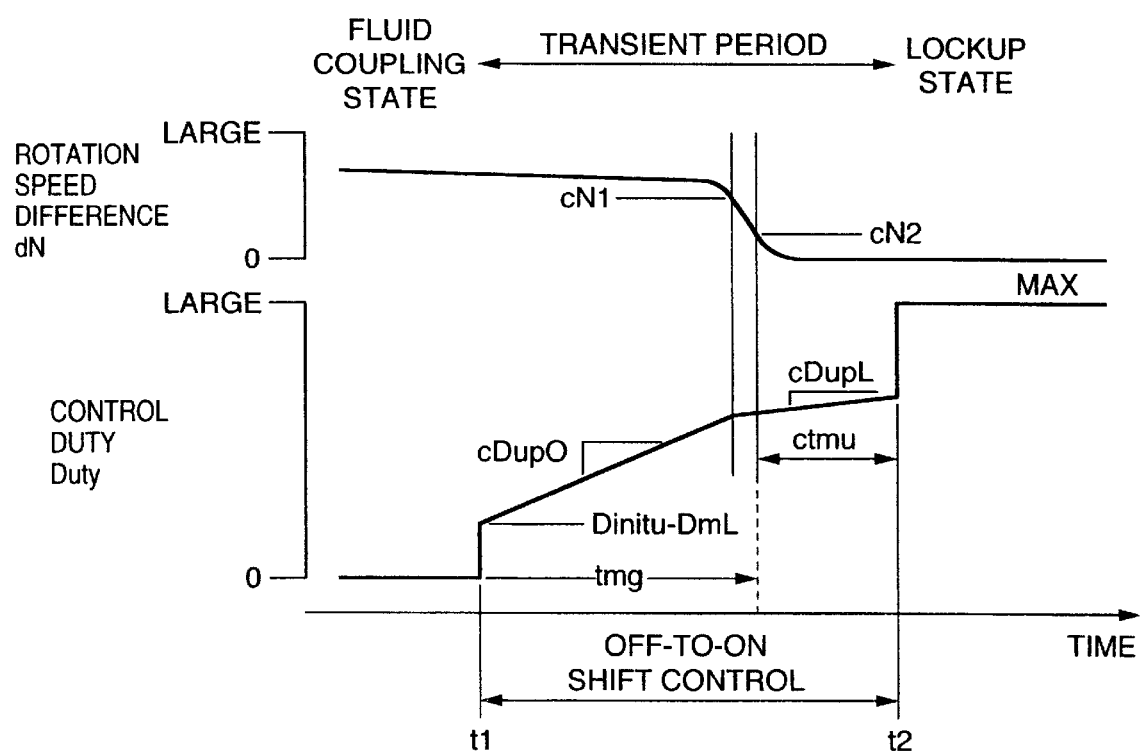
FIG. 7 is a time chart showing the operation during lockup OFF-ON shift control of the working pressure controller.

FIG. 6 is a flow chart showing an embodiment of the operation during lockup OFF-ON (OFF-to-ON) shift control of the working pressure controller 120 and FIG. 7 is a time chart showing the embodiment of the operation during lockup OFF-ON shift control of the working pressure controller 120.

In the time chart of FIG. 7, an OFF-ON shift control operation is carried out between time points t1 and t2. The time point t1 occurs immediately after the ATC 100 determines that the fluid coupling state changes to the lockup state. At the time point t2, the control duty becomes maximum (MAX) and a complete lockup state is reached. FIG. 6 shows flow of a process executed by the ATC 100 every constant time during the OFF-ON shift control operation.

In step S30 of FIG. 6, the working pressure controller 120 decides whether the process is provided for the first time immediately after t1 at which the initial lockup command is issued. If for the first time, the program proceeds to step S31 but if not for the first time, the program proceeds to step S33.

When the initial process proceeds, the initial working pressure setting unit 122 determines, from turbine torque Tt representing input torque, an engaging duty Dinitu corresponding to a working pressure at which the lockup operation starts. Here, rotational inertia torque of the engine is taken into consideration to determine the engaging duty Dinitu as a function having variables of turbine torque and engine speed, that is, f(Tt, Ne). For example, the engaging duty is determined to be (Tt+ke×Ne) in which the turbine torque is added to the product of engine speed Ne and predetermined constant ke. The term of engine speed Ne may be of either turbine speed Nt or (engine speed−turbine speed). Alternatively, the engaging duty Dinitu may be determined from the turbine torque Tt. Data of the engaging duty Dinitu in relation to the turbine torque Tt is experimentally determined in advance and is stored in the ROM 2.

Next, in step S32, the initial working pressure setting unit 122 subtracts a margin DmL considering the machine difference and temporal degradation from the engaging duty Dinitu obtained in the step S31 to determine the initial control duty Duty which in turn is delivered to the lockup solenoid 34. If the engaging duty corresponding to the initial working pressure is set to Dinitu in an apparatus in which the torque converter and lockup clutch have large irregularities due to manufacture, there is a possibility that the lockup state is suddenly established at the working pressure corresponding to the Dinitu, causing a shock. To avoid this inconvenience, Dinitu−DmL obtained by subtracting the margin from the engaging duty is determined to be a duty value corresponding to a working pressure at which the immediate lockup can be prevented even in the presence of the irregularities and the Dinitu−DmL is set as an engaging duty corresponding to the initial value of working pressure in the OFF-ON shift control.

Namely, the initial value of working pressure at the time point t1 corresponds to (Dinitu−DmL) as shown in FIG. 7.

While the Dinitu changes with the turbine torque Tt, the margin DmL is given regardless of the turbine torque in order that the lockup can always be controlled such that it starts at a constant time point regardless of the turbine torque.

On the other hand, when the process is determined not to be initial one in the step 30, the program proceeds to the step S33 in which the speed difference calculating unit 124 calculates an absolute value |Ne−Nt| of difference between engine speed Ne and turbine speed Nt to determine a rotation speed difference dN.

In step S34, the working pressure increasing/decreasing unit 126 compares the rotation speed difference dN with a predetermined threshold value cN1 to decide whether lockup has not started yet or has started already. If the difference dN is larger than the predetermined value cN1, it is determined that lockup has not started and the program proceeds to step S35. If the difference dN is smaller than the predetermined value cN1, it is determined that lockup has started and the program proceeds to step S37.

When the lockup has not started, the working pressure increasing/decreasing unit 126 sets a predetermined value cDupO as increasing value dDup of control duty. The predetermined value cDupO is determined experimentally in advance and stored in the ROM 2.

Subsequently, in step S36, the working pressure increasing/decreasing unit 126 adds the increasing value dDup to the control duty Duty and delivers the sum.

After the control duty (Dinitu−DmL) corresponding to the initial working pressure is given in this manner as shown in FIG. 7, the working pressure increases gradually at a constant increasing rate of dDup (=predetermined value cDupO).

On the other hand, when "No" is issued in the step S34 indicating that the lockup has started, the working pressure increasing/decreasing unit 126 compares the detected rotation speed difference dN with a predetermined value cN2 which is considered to reflect the fact that the state is substantially brought into lockup. If "Yes" is issued to indicate that the lockup is considered to be still incomplete, the program proceeds to step S38 but if "No" is issued to indicate that the lockup is considered to be almost complete, the program proceeds to step S40.

When shift to the lockup state has not been completed yet, the working pressure increasing/decreasing unit 126 resets a timer tm in the step S38.

Then, in step S39, the working pressure increasing/decreasing unit 126 sets a predetermined value cDupL in the increasing value (increasing rate) dDup with the aim of reducing a shock due to engagement of the lockup clutch. Since the predetermined value cDupL is smaller than the increasing value dDup (=predetermined value cDupO) set in the step S35 as will be seen in FIG. 7, the working pressure increases at a slower increasing rate. The predetermined value cDupL is determined experimentally in advance and is stored in the ROM 2.

Namely, in the present embodiment, the working pressure is increased at a relatively large increasing rate of cDupO before the start of the engagement of lockup clutch during which the rotation speed difference dN is larger than the predetermined value cN1 shown in FIG. 7, so that time preceding the lockup start can be decreased to improve the response capability. On the other hand, the working pressure is increased at a relatively small increasing rate of cDupL during an interval between the start of engagement operation of lockup clutch at which the rotation speed difference dN becomes smaller than the predetermined value cN1 shown in FIG. 7 and the completion of lockup operation at which the rotation speed difference dN is larger than the predetermined value cN2 shown in FIG. 7. Consequently, the working pressure is not increased abruptly during the OFF-ON shift control period and the shock due to the lockup clutch engagement can be mitigated.

On the other hand, when "No" is issued in the step S37, that is, when a lockup state is considered to be substantially established, the program proceeds to the step S40 in which the working pressure increasing/decreasing unit 126 decides whether the count time of the timer tm is less than a predetermined time ctmu. The predetermined time ctmu is for deciding the end of lockup. If "Yes" is issued indicating that the predetermined time has not elapsed, the program proceeds to step S41 but if "No" is issued indicating that the predetermined time ctmu has elapsed, the program proceeds to step S42. The predetermined time is determined experimentally in advance and is set in the timer.

When the predetermined time ctmu has not elapsed, the working pressure increasing/decreasing unit 126 adds "1" to the timer tm in the step S41 and executes the steps following the step S39, waiting for steady engagement of the lockup clutch.

When the predetermined time ctmu has elapsed with "No" issued in the step S40, the working pressure increasing/decreasing unit 126 determines the end of the engagement and the program proceeds to step S42 in which the control duty is maximized to deliver a maximum pressure corresponding to control duty MAX.

This time point corresponds to the time point t2 shown in FIG. 7 at which the OFF-ON shift control ends.

As described above, in the OFF-ON shift control according to the present embodiment, the initial value of working pressure at the time point t1 is first set to correspond to the control duty (Dinitu−DmL), so that control is carried out such that the initial value is small when the turbine torque is small but is large when the turbine torque is large, thereby ensuring that the engagement of the lockup clutch can be controlled such that it can always be started at the constant time point.

Further, since the working pressure is increased at a relatively large increasing rate before the engagement of lockup clutch starts, the time preceding the start of the lockup engagement can be shortened to thereby improve the response capability and fuel economy. On the other hand, during an interval between the initial phase of the lockup clutch engagement and the completion of the lockup clutch engagement, the working pressure is increased at a relatively small increasing rate, with the result that the working pressure is not increased abruptly on the way to shift to the lockup state and an instantaneous shock upon the lockup can be mitigated.

Figure 8:
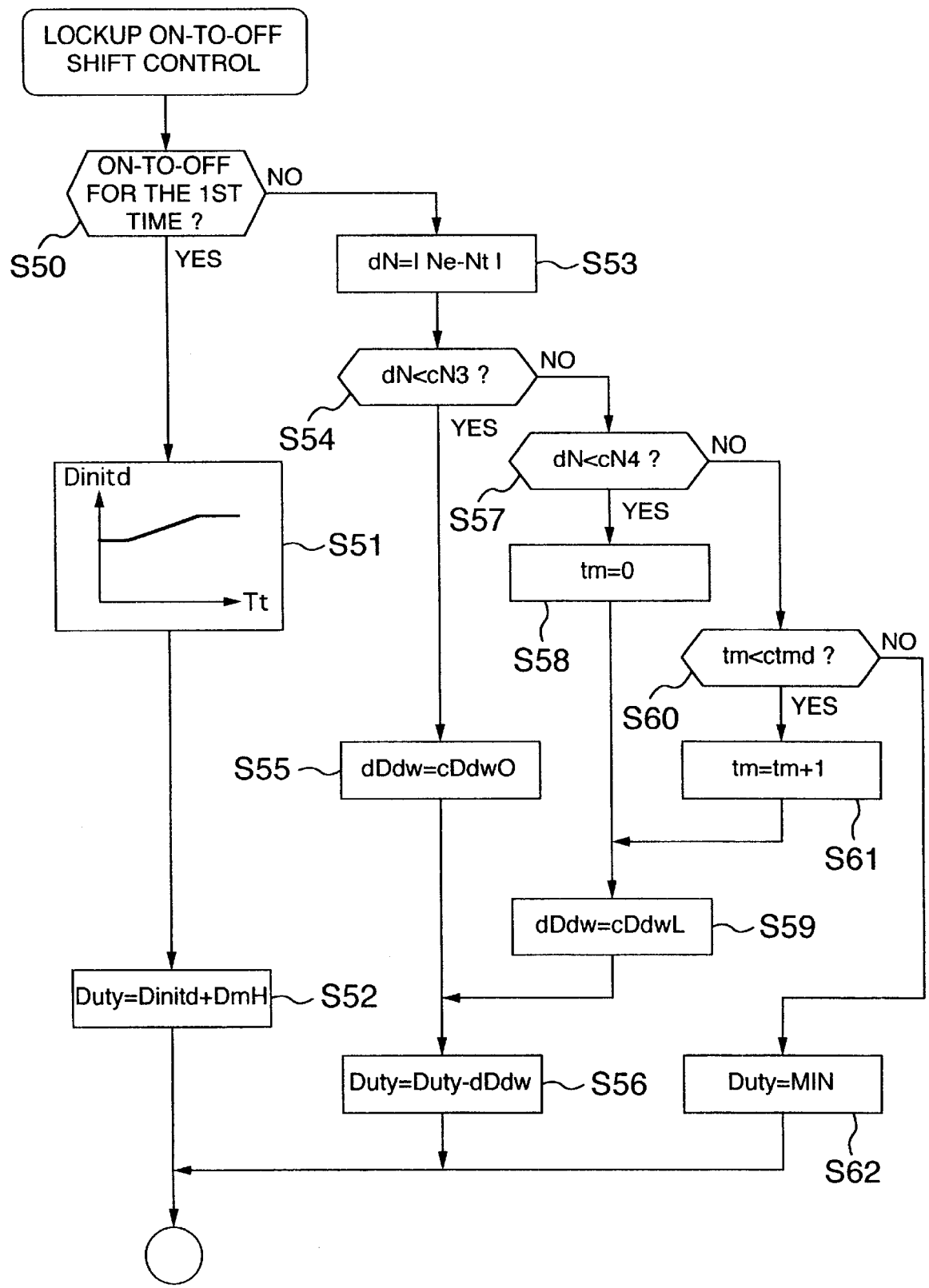
FIG. 8 a flow chart showing an embodiment of operation during lockup ON-OFF shift of the working pressure controller used in the embodiment of the automatic transmission controller.
Figure 9:
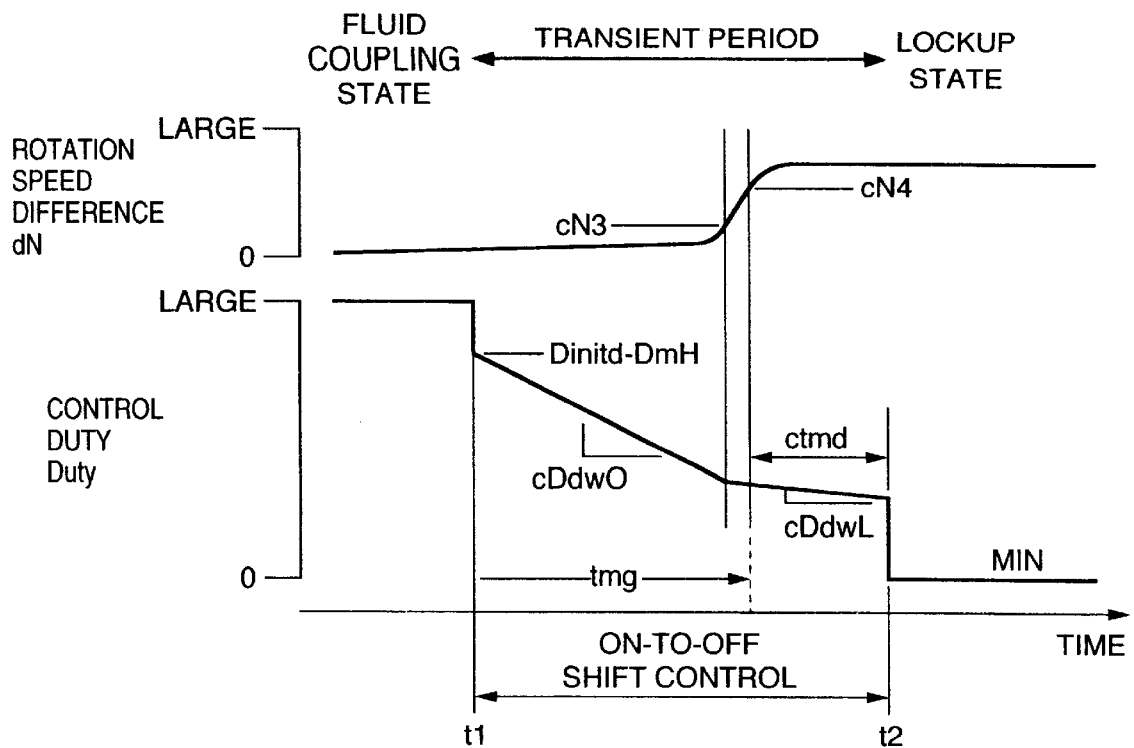
FIG. 9 is a time chart showing the operation of during lockup ON-OFF shift control of the working pressure controller.

Referring now to FIGS. 8 and 9, the operation of the working pressure controller 120 during shift control from the lockup state to the fluid coupling state (hereinafter referred to as ON-OFF (ON-to-OFF) shift control) will be described.

FIG. 8 is a flow chart showing the operation during lockup ON-OFF shift control of the working pressure controller 120 used in the automatic transmission controller in the present embodiment and FIG. 9 is a time chart showing the operation of the working pressure controller 120.

A lockup ON-OFF control operation is carried out between time points t1 and t2 shown in FIG. 9. The time point t1 occurs immediately after the ATC 100 determines that the lockup state changes to the fluid coupling state. At the time point t2, the control duty assumes a minimum value MIN. The operational flow chart of FIG. 8 shows flow of a process executed by the ATC 100 every constant time during the ON-OFF shift control operation.

In step S50 of FIG. 8, the working pressure controller 120 decides whether the process is started for the first time immediately after the time point t1 at which the initial lockup relief command is issued. If for the first time, the program proceeds to step S51 but if not for the first time, the program proceeds to step S53.

When the initial process proceeds, the initial working pressure setting unit 122 determines, from turbine torque Tt representing input torque, a relief duty Dinitd corresponding to a working pressure at which the lockup relief operation is started. Here, rotational inertia torque of the engine is taken into consideration to determine the relief duty Dinitd as a function of f(Tt, Ne). For example, the relief duty is determined to be (Tt+ke×Ne) in which the turbine torque is added to the product of engine speed Ne and predetermined value ke. The term of engine speed Ne may be replaced with turbine speed Nt. Alternatively, the relief duty Dinitu may be determined from the turbine torque Tt. Data of the relief duty Dinitu in relation to the turbine torque Tt is experimentally determined in advance and is stored in the ROM 2.

Next, in step S52, the initial working pressure setting unit 122 adds a margin DmH considering the machine difference and temporal degradation to the previously obtained relief duty Dinitd to determine the initial control duty Duty which in turn is delivered to the lockup solenoid 34.

If the control duty corresponding to the initial working pressure is set to Dinitd in an automatic transmission in which the torque converter and lockup clutch have large irregularities in characteristics due to manufacture, there is a possibility that the lockup state is suddenly relieved at the working pressure corresponding to the Dinitd, causing a large shock. To avoid this inconvenience, Dinitd+DmH obtained by adding the margin to the relief duty is determined to be a duty value corresponding to a working pressure at which the immediate lockup relief can be prevented even in the presence of irregularities in characteristics and the Dinitd+DmH is set as a relief duty corresponding to the initial value of working pressure in the ON-OFF shift control.

Namely, the initial value of working pressure at the time point t1 corresponds to (Dinitd+DmH) as shown in FIG. 9. While the Dinitd changes with the turbine torque Tt, the margin DmH is given regardless of the turbine torque in order that the lockup relief can always be controlled such that it starts at a constant time point.

When the process is determined not to be initial one in the step S50, the program proceeds to the step S53 in which the speed difference calculating unit 124 calculates an absolute value |Ne−Nt| of difference between engine speed Ne and turbine speed Nt to determine a rotation speed difference dN.

In step S54, the working pressure increasing/decreasing unit 126 compares the rotation speed difference dN with a predetermined value cN3 to decide whether lockup has not been relieved yet or has been relieved already. If the difference dN is smaller than the predetermined value cN3, it is determined that the lockup has not been relieved and the program proceeds to step S55. If the difference dN is larger than the predetermined value cN3, it is determined that the lockup has been relieved and the program proceeds to step S57.

When the lockup has not been relieved, the working pressure increasing/decreasing unit 126 sets a predetermined value cDdwO as decreasing value dDdw of control duty. The predetermined value cDdwO is determined experimentally in advance and stored in the ROM 2.

Subsequently, in step S56, the working pressure increasing/decreasing unit 126 subtracts the decreasing value dDdw from the control duty ratio "Duty" and delivers the difference.

After the control duty (Dinitu+DmH) corresponding to the initial working pressure is given in this manner as shown in FIG. 9, the working pressure decreases gradually at a constant decreasing rate of dDdw (=predetermined value cDdwO).

On the other hand, when "No" is issued in the step S54 indicating that the lockup relief begins starting, the working pressure increasing/decreasing unit 126 compares the detected rotation speed difference dN with a predetermined value cN4 which is considered to reflect the fact that the lockup relief is almost completed. If "Yes" is issued to indicate that the lockup relief is considered to be still incomplete, the program proceeds to step S58 but if "No" is issued to indicate that the lockup relief is considered to be almost complete, the program proceeds to step S60.

When the lockup relief has not been completed yet, the working pressure increasing/decreasing unit 126 resets the timer tm in the step S58.

Then, in step S59, the working pressure increasing/decreasing unit 126 sets a predetermined value cDdwL in the decreasing value (decreasing rate) dddw with the aim of reducing a shock during the lockup relief. Since the predetermined value cDdwL is smaller than the decreasing value dDdw (=predetermined value cDdwO) set in the step S55 as will be seen in FIG. 9, the working pressure decreases at a slower decreasing rate. The predetermined value cDdwL is determined experimentally in advance and is stored in the ROM 2.

Namely, in the present embodiment, the working pressure is decreased at a relatively large decreasing rate before the start of the lockup relief operation during which the rotation speed difference dN is smaller than the predetermined value cN4 shown in FIG. 9, so that time preceding the lockup relief can be decreased to improve the response capability. On the other hand, the working pressure is decreased at a relatively small decreasing rate during an interval between the start of lockup relief operation at which the rotation speed difference dN becomes larger than the predetermined value cN3 shown in FIG. 9 and the completion of lockup clutch relief at which the rotation speed difference dN is smaller than the predetermined value cN4 shown in FIG. 9. Consequently, the working pressure is not decreased abruptly during the ON-OFF shift control period and the shock due to the lockup clutch relief can be mitigated.

On the other hand, when "No" is issued in the step S57, that is, when a lockup clutch relief state is considered to be substantially completed, the program proceeds to the step S60 in which the working pressure increasing/decreasing unit 126 decides whether the count time of the timer tm is less than a predetermined time ctmd. The predetermined time ctmd is for deciding the end of lockup relief. If "Yes" is issued indicating that the predetermined time has not elapsed, the program proceeds to step S61 but if "No" is issued indicating that the predetermined time ctmd has elapsed, the program proceeds to step S62. The predetermined time ctmd is determined experimentally in advance and is set in the timer.

When the predetermined time ctmd has not elapsed, the working pressure increasing/decreasing unit 126 adds "1" to the timer tm in the step S61, waiting for steady relief of the lockup clutch.

When the predetermined time ctmd has elapsed with "N" issued in the step S60, the working pressure increasing/decreasing unit 126 determines the end of the relief and the program proceeds to the step S62 in which the control duty is minimized to deliver a minimum pressure corresponding to control duty MIN.

This time point corresponds to the time point t2 shown in FIG. 9 at which the ON-OFF shift control ends.

As described above, in the ON-OFF shift control according to the present embodiment, the initial value of working pressure at the time point t1 is first set to correspond to the control duty (Dinitd+DmH), so that the initial value can be variable with the turbine torque and hence the lockup relief can be controlled such that it can always be started at the constant time point.

Further, since the working pressure is decreased at a relatively large decreasing rate before the lockup clutch is relieved, the time preceding the start of the lockup clutch relief can be shortened to thereby improve the response capability. On the other hand, during an interval between the start of the lockup clutch relief operation and the completion of the lockup clutch relief, the working pressure is decreased at a relatively small decreasing rate, with the result that the working pressure is not decreased abruptly during the ON-OFF shift control period and a shock due to the lockup clutch relief can be reduced.

Figure 10:
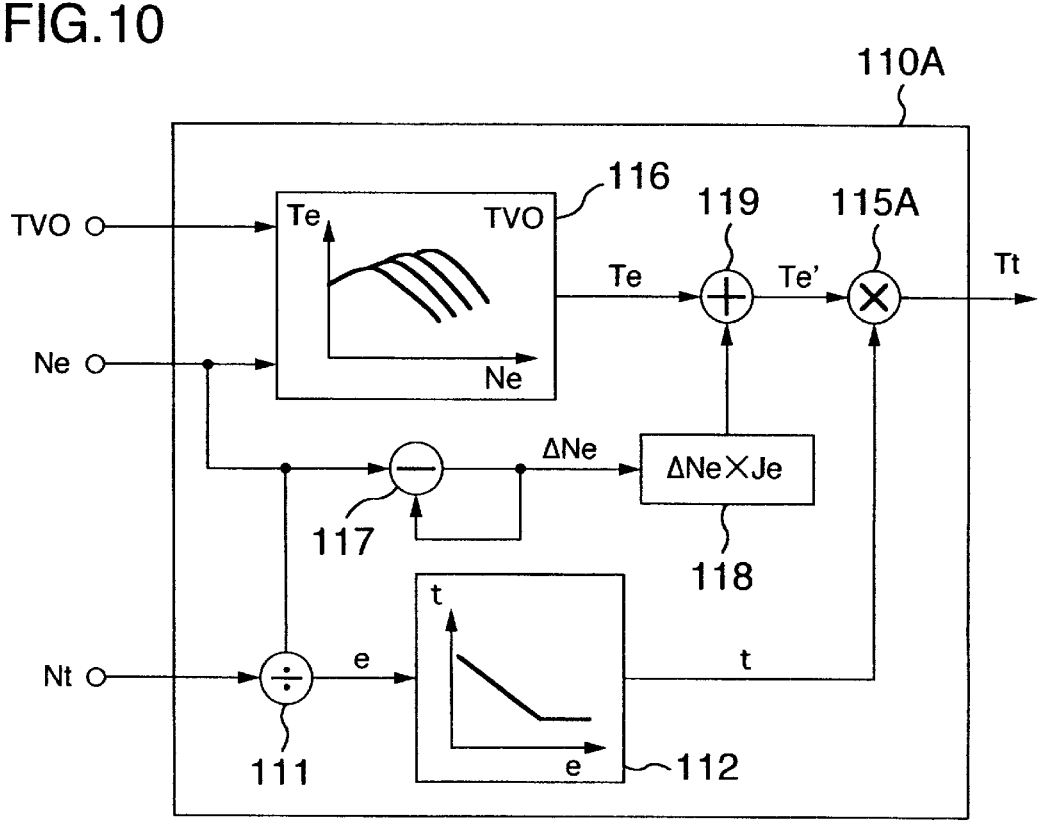
FIG. 10 is a block diagram showing the construction of a modified turbine torque calculator used in the embodiment of the automatic transmission controller.

Referring now to FIG. 10, a modified embodiment of the turbine torque calculator used in the automatic transmission controller in the present embodiment will be described. FIG. 10 illustrates, in block diagram form, the construction of the modification of the turbine torque calculator.

In the turbine torque calculator, as designated by reference numeral 110A, a dividing unit 111 divides the turbine speed Nt by the engine speed Ne to provide a slip ratio e of the torque converter 20. A torque ratio calculating unit 112 determines a torque ratio t from a torque ratio characteristic of torque converter 20 which is stored in advance. An engine torque calculating unit 116 responds to a throttle opening TVO and the engine speed Ne to determine engine torque Te from an engine torque characteristic map which is stored in advance.

In the present method, the engine torque Te is used in place of the pump capacity coefficient τ and so inertia moment accompanying a change in engine rotation must be taken into consideration. Accordingly, a difference calculating unit calculates a difference between the present value and preceding value of the engine speed Ne to determine an engine speed change quantity ANe. A multiplying unit 118 multiplies the engine speed change quantity ANe by inertia moment Je. An adding unit 119 adds a multiplication result from the multiplying unit 118 to the engine torque Te to determine inertia torque Te'. A multiplying unit 115A multiplies the inertia torque T2' by the torque ratio t to obtain turbine torque Tt.

Figure 11:
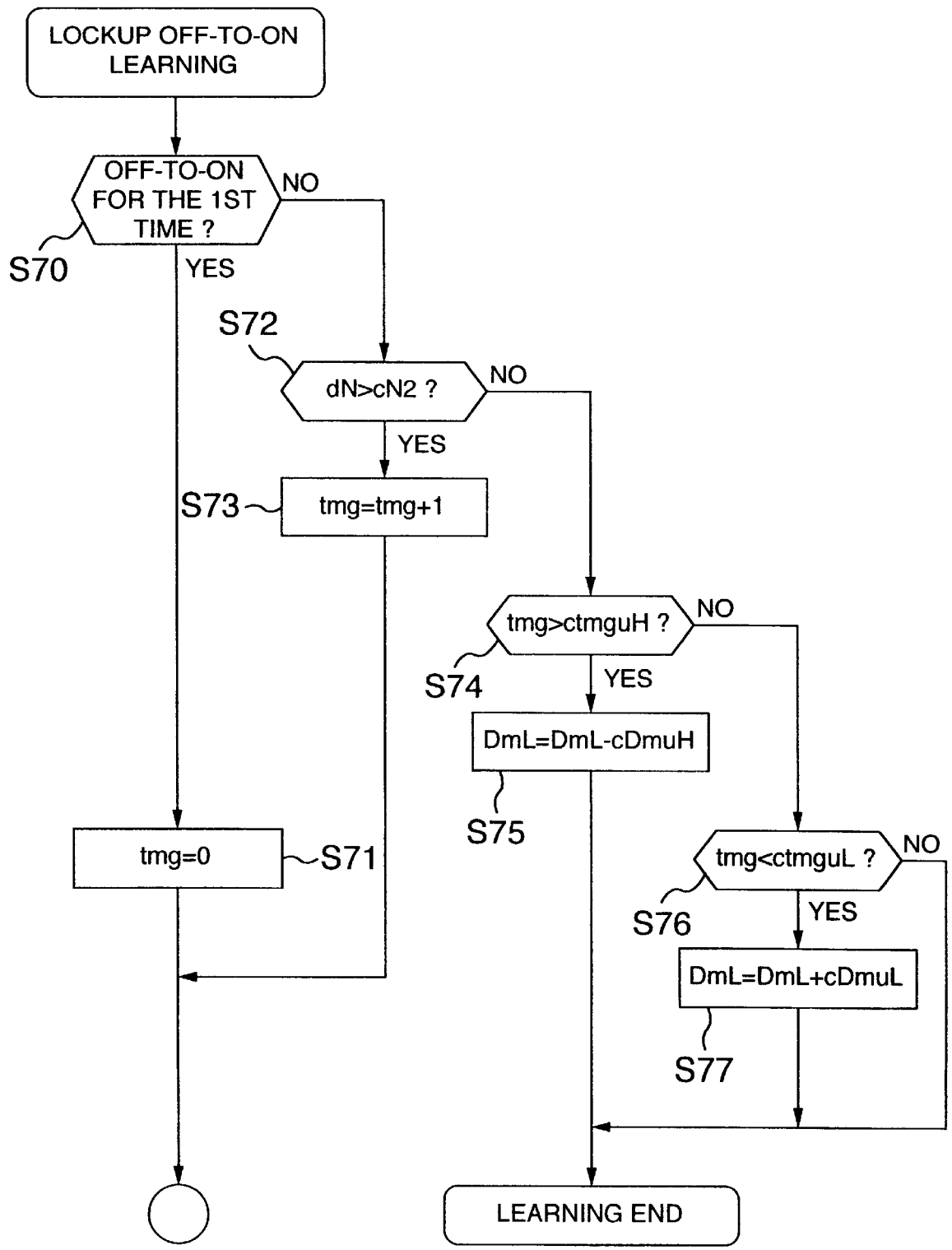
FIG. 11 is a flow chart showing an embodiment of learning/controlling operation during lockup OFF-ON shift of the working pressure controller used in the embodiment of the automatic transmission controller.
Figure 12:
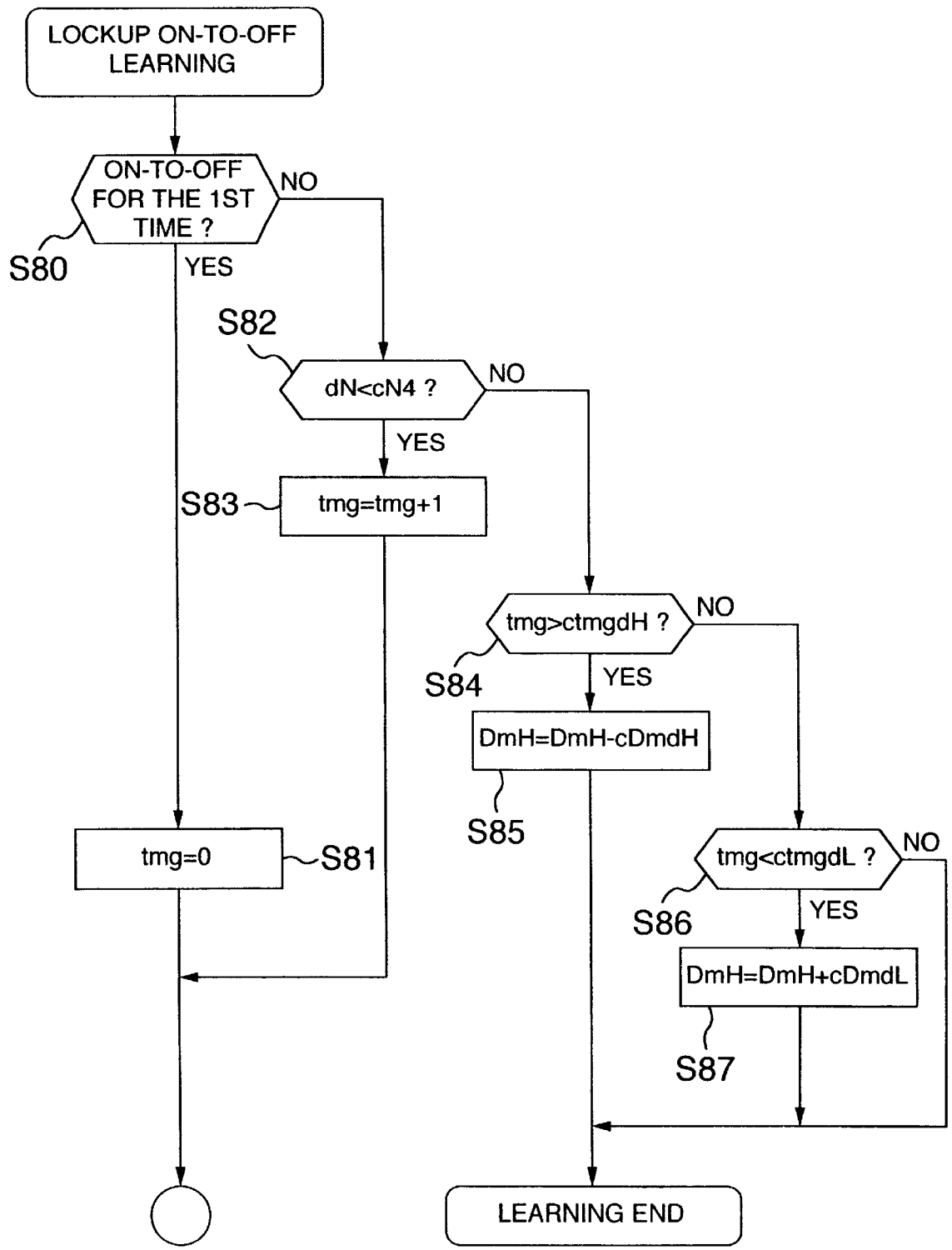
FIG. 12 is a flow chart showing an embodiment of learning/controlling operation during lockup ON-OFF shift of the working pressure controller used in the embodiment of the automatic transmission controller.

Referring now to FIGS. 11 and 12, an embodiment of learning/controlling of working pressure by the working pressure controller used in the automatic transmission controller (ATC) will be described. The overall construction of the controller of automatic transmission controller in the present embodiment is the same as that shown in FIG. 1 and the automatic transmission controller in the present embodiment is constructed similarly to FIG. 4. Sequence of a learning/controlling operation shown in FIG. 11 or 12 is executed independently of the sequence shown in FIGS. 6 and 8 at intervals of predetermined time.

While each of the margins DmL and DmH in the step S32 of FIG. 6 and the step S52 of FIG. 8 has a fixed value, margins DmL and DmH are updated through learning/controlling in the present embodiment to permit the time preceding the lockup clutch engagement and lockup clutch relief to be controlled more stably.

Firstly, the learning/controlling operation of the working pressure controller 120 during OFF-ON shift control of lockup will be described with reference to FIG. 11 showing a flow chart of the operation during the lockup OFF-ON shift control carried out by the working pressure controller.

In step S70, the working pressure controller 120 decides whether a command for switching from lockup OFF to lockup ON is for the first time. If the command is provided for the first time, the program proceeds to step S71 but if not for the first time, the program proceeds to step S72.

When the command is for the first time, the working pressure controller 120 resets a learning timer tmg in the step S71.

When the command is not initial, that is, when "No" is issued in the step S70, the working pressure controller 120 decides whether the rotation speed difference dN is larger than the predetermined value cN2. If larger, it is determined that the engagement of the lockup clutch has not started yet and the program proceeds to step S73 but if smaller, it is determined that the lockup clutch engagement has already started and the program proceeds to step S74. The predetermined value cN2 is the same as that shown in FIG. 7.

When the lockup clutch engagement has not started yet, the working pressure controller 120 counts up the learning timer tmg in the step S73.

When "No" is issued in the step S72, it is determined that the direct coupling shift time representing the limit period between start of the OFF-ON shift control and completion of the lockup state has elapsed. In the step S74, the working pressure controller 120 decides whether the count time of the learning timer tmg is larger than a predetermined value ctmguH. If larger, the program proceeds to step S75 but if smaller, the program proceeds to step S76. The predetermined value ctmguH is a maximum value of the direct coupling shift time and is necessary to learn that the margin DmL is to be adjusted such that the count time of the learning timer tma does not exceed the predetermined value ctmguH.

If the decision result in the step S74 is "Yes", the working pressure controller 120 subtracts a predetermined value cDmuH from the margin DmL in the step S75. In other words, the margin is reduced to raise the initial control duty, thereby shortening the time preceding the engagement. Thereafter, the learning during the lockup ON ends.

When "No" is issued in the step S74, the working pressure controller 120 decides in the step S76 whether the count time of the learning timer is less than a predetermined value ctmguL. If smaller, the program proceeds to step S77 but if not smaller, it is determined that the time preceding the engagement is within the control range and the learning ends. The predetermined value ctmguL is a minimum value of the direct coupling shift time and is necessary to learn that the margin DnL is to be adjusted such that the count time of the learning timer tmg does not fall below the predetermined value ctmguL.

If the count time is determined to be smaller in the step S76, the working pressure controller 120 adds a predetermined value cDmuL to the margin DmL in the step S77. As a result, the margin is increased so that the initial control duty may be decreased to prolong the time preceding the engagement. Through this, the shock during lockup can be reduced. Thereafter, the learning during the lockup ON ends.

According to the learning/controlling shown in the flow chart of FIG. 11, the OFF-ON shift control period, that is, the period tmg ranging over the start of the lockup clutch engagement operation and the substantial completion of the engagement state can be controlled such that it can always be within the time range between the maximum ctmguH and the minimum ctmguL. This can ensure that the lockup operation can always be carried out stably in commensurate with changes in characteristics of the automatic transmission caused by irregularities due to manufacture and temporal change.

Referring now to FIG. 12, an embodiment of learning/controlling operation by the working pressure controller 120 during lockup ON-OFF shift control will be described. FIG. 12 shows a flow chart of the operation during lockup ON-OFF shift control by the working pressure controller used in the automatic transmission controller.

In step S80, the working pressure controller 120 decides whether a command for switching from lockup ON to lockup OFF is produced for the first time. If the command is for the first time, the program proceeds to step S81 but if not for the first time, the program proceeds to step S82.

When the command is for the first time, the working pressure controller 120 resets the learning timer tmg in the step S81.

When the command is not for the first time, that is, when "No" is issued in the step S80, the working pressure controller 120 decides whether the rotation speed difference dN is larger than the predetermined value cN4. If smaller, it is determined that the lockup clutch has not been relieved yet and the program proceeds to step S83 but if larger, it is determined that the lockup clutch relief has already started and the program proceeds to step S84. The predetermined value cN4 is the same as that shown in FIG. 9.

When the lockup clutch has not been relieved yet, the working pressure controller 120 counts up the learning timer tmg in the step S83.

When "No" is issued in the step S82, it is determined that the fluid coupling shift time representing the limit period between start of the ON-OFF shift control and completion of the relief state has elapsed. In the step S84, the working pressure controller 120 decides whether the count time of the learning timer tmg is larger than a predetermined value ctmgdh. If larger, the program proceeds to step S85 but if smaller, the program proceeds to step S86. The predetermined value ctmgdH is a maximum value of the fluid coupling shift time and is necessary to learn that the margin DmH is to be adjusted such that the count time of the learning timer tma does not exceed the predetermined value ctmgdH.

If the decision result in the step S84 is "Yes", the working pressure controller 120 subtracts a predetermined value cDmdH from the margin DmH in the step S85. In other words, the margin is reduced to decrease the initial control duty, thereby shortening the time preceding the relief. Thereafter, the learning during the lockup OFF ends.

When "No" is issued in the step S84, the working pressure controller 120 decides whether the count time of the learning timer is less than a predetermined value ctmgdL. If smaller, the program proceeds to step S87 but if not smaller, it is determined that the time preceding the relief is within the control range and the learning ends. The predetermined value ctmgdL is a minimum value of the fluid coupling shift time and is necessary to learn that the margin DmH is to be adjusted such that the count time of the learning timer tmg does not fall below the predetermined value ctmgdL.

If the count time is determined to be smaller in the step S86, the working pressure controller 120 adds a predetermined value cDmdL to the margin DmH in the step 87 to increase the margin so that the initial control duty may be increased to prolong the time preceding the relief. Thereafter, the learning during the lockup OFF ends.

According to the learning/controlling shown in the flow chart of FIG. 12, the length of the ON-OFF shift control period, that is, the period tmg ranging over the start of the lockup clutch relief operation and the completion of relief state can be controlled such that it can always be within the time range between the maximum ctmgdH and the minimum ctmgdL. This can ensure that the lockup operation can always be carried out stably in commensurate with changes in characteristics of the automatic transmission caused by irregularities due to manufacture and temporal change.

Each of the processes in the flow charts shown in FIGS. 11 and 12 is repeated every predetermined time, for example, 10 ms.

As described above, according to the present embodiment, the engagement shift time and the fluid coupling shift time are learnt and therefore, even in the presence of temporal changes, the optimum margins DmL and DmH can be set to perform stable lockup engagement and relief.

Figure 13:
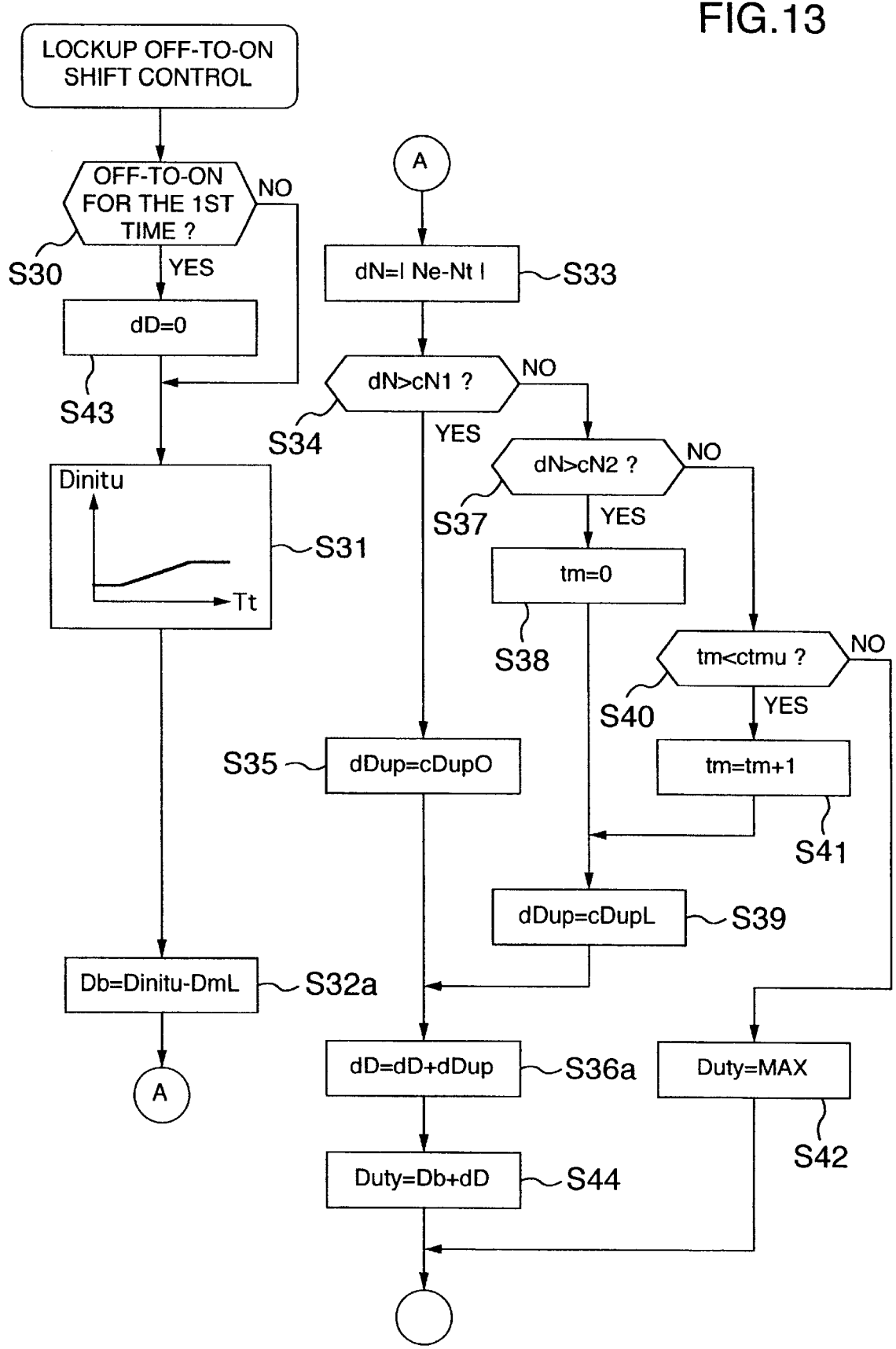
FIG. 13 is a flow chart showing another embodiment of operation during OFF-ON shift control of the working pressure controller used in the embodiment of the automatic transmission controller.
Figure 14:
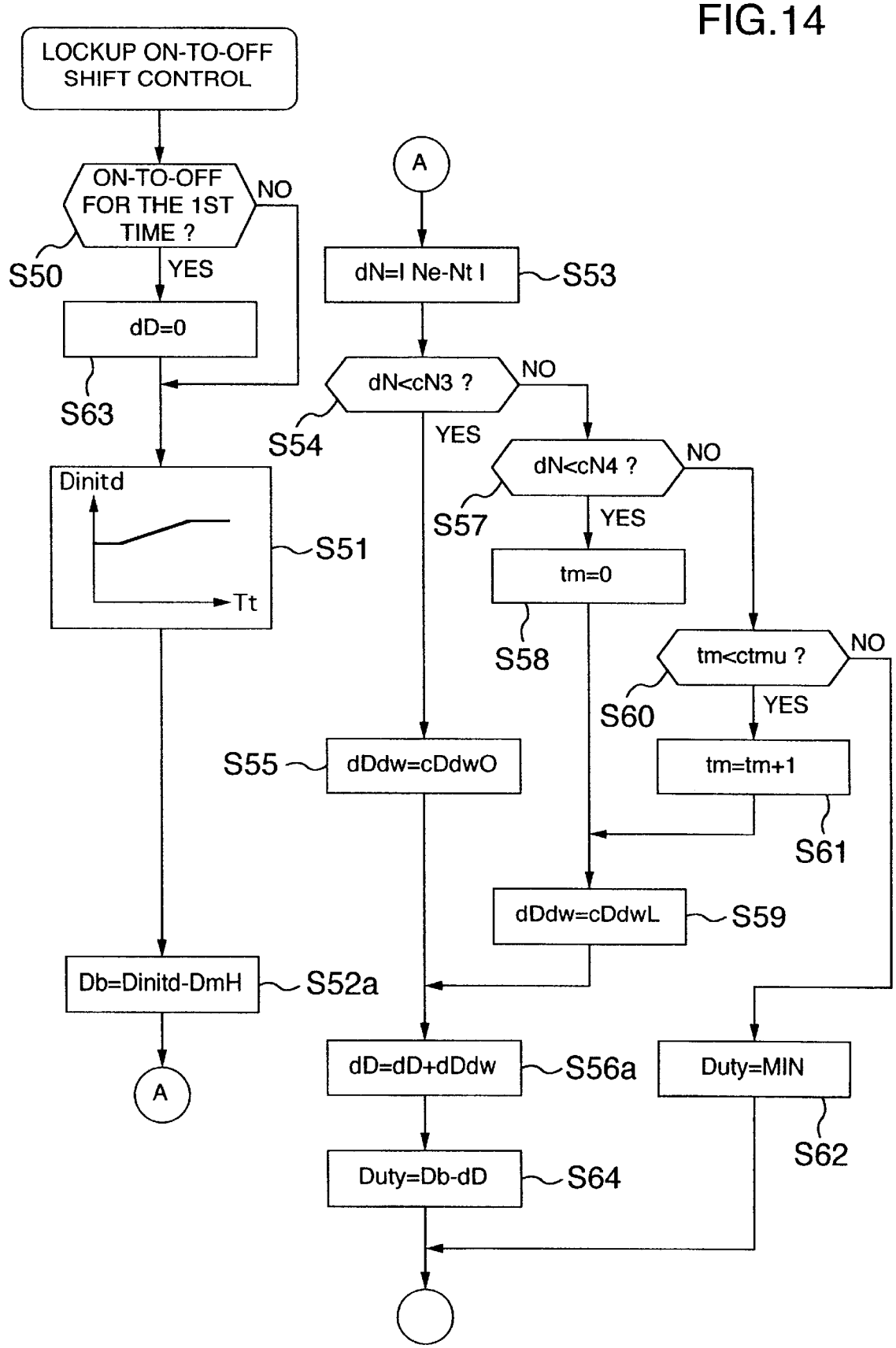
FIG. 14 is a flow chart showing another embodiment of operation during ON-OFF shift control of the working pressure controller used in the embodiment of the automatic transmission controller.

Referring now to FIGS. 13 and 14, another embodiment of operation of the working pressure controller used in the automatic transmission controller of the present invention will be described. In the present embodiment, the overall construction of the automatic transmission controller is similar to that shown in FIG. 1 and an ACT in the present embodiment is constructed similarly to FIG. 4.

Firstly, an operation of the working pressure controller 120 during lockup OFF-ON shift control will be described with reference to FIG. 13.

In the present embodiment, calculations in the steps S31 and S32 in the operational flow chart of FIG. 6 when the lockup clutch is changed from the relief state to the engaging state are made every execution cycle of the flow. In the figure, process steps identical to those in FIG. 6 are designated by identical reference numerals.

In the present embodiment, the working pressure controller 120 used in the automatic transmission controller operates during lockup OFF-ON shift control as shown in a flow chart of FIG. 13.

In the initial lockup OFF to lockup ON operation (in the case of "Yes" in step S30), the working pressure controller 120 resets an increasing addition value dD in step S43.

In step S32a, the control duty Duty directly determined by the working pressure controller 120 is temporarily stored in the form of a base duty Db in, for example, the RAM.

Steps following step S33 are essentially identical to those in FIG. 6 with only exception that the working pressure controller 120 adds the increasing value to the increasing addition value in place of direct addition of the increasing value to the control duty Duty.

Further, in ensuing step S44, the working pressure controller 120 adds the base duty Db determined in the step S32a and the increasing addition value dD to determine a control duty Duty.

According to the embodiment of FIG. 13, even when turbine torque Tt is changed with a change in, for example, throttle opening TVO at the time that the driver abruptly operates the accelerator during the lockup operation shift, the base duty Db is calculated in step S31 each time that the abrupt operation occurs and the time for lockup engagement can be constant.

Next, referring to FIG. 14, another embodiment of the operation of the working pressure controller 120 during lockup ON-OFF shift control will be described.

In the present embodiment, calculations in the steps S51 and S52 in the operational flow chart shown in FIG. 8 when the lockup clutch is changed from the engagement state to the relief state are made every execution cycle of the flow. Process steps identical to those in FIG. 8 are designated by identical reference numerals.

In the present embodiment, the working pressure controller 120 used in the automatic transmission controller operates during the lockup ON-OFF shift control in accordance with a flow chart shown in FIG. 14.

In the initial lockup ON to lockup OFF operation (in the case of "Yes" in step S50), the working pressure controller 120 resets a decreasing addition value dD in step S63.

In step S52a, the control duty Duty directly determined by the working pressure controller 120 is temporarily stored in the form of a base duty Db in, for example, the RAM.

Steps following step S53 are essentially identical to those in FIG. 8 with only exception that the working pressure controller 120 adds the decreasing value to the decreasing addition value in place of direct addition of the decreasing value to the control duty Duty.

Further, in ensuing step S64, the working pressure controller 120 adds the base duty Db determined in the step S52a and the decreasing addition value dD to determine a control duty Duty.

According to the embodiment of FIG. 14, even when turbine torque Tt is changed with a change in, for example, throttle opening TVO during the shift, the base duty Db is calculated in step S51 each time that the change occurs and the time for lockup relief can be constant.

As described above, according to the present embodiment, the lockup engagement time and the lockup relief time can be constant even when the turbine torque changes.

According to the present invention, a disordered feeling during the lockup operation can be reduced.

What is claimed is:

1. An automatic transmission controller for use with an automatic transmission which is provided with a torque converter having a fluid coupling unit for coupling driving force to a transmission through fluid coupling and a direct coupling unit for coupling the driving force to the transmission through mechanical coupling and being operative to take a fluid coupling state, a direct coupling state or an intermediate state between the fluid and direct coupling states in accordance with a working pressure applied to the direct coupling unit, comprising:

working pressure control means for generating a control signal which changes an initial value of said working pressure in accordance with said driving force during the period of transition between the fluid coupling state and the direct coupling state wherein said working pressure control means further includes means for changing said working pressure from its initial value in accordance with a lapse of time during the transition period, and means for decreasing the rate of change of the working pressure on the way wherein said working pressure control means further includes means for detecting a rotation speed difference between input and output of said torque converter and wherein when said rotation speed difference comes into a predetermined range, said rate of change of the working pressure is decreased.

2. An automatic transmission controller for use with an automatic transmission which is provided with a torque converter having a fluid coupling unit for coupling driving force to a transmission through fluid coupling and a direct coupling unit for coupling the driving force to the transmission through mechanical coupling and being operative to take a fluid coupling state, a direct coupling state or an intermediate state between the fluid and direct coupling states in accordance with a working pressure applied to the direct coupling unit, comprising:

working pressure control means for generating a control signal which changes an initial value of said working pressure in accordance with said driving force during the period of transition between the fluid coupling state and the direct coupling state wherein said working pressure control means further includes means for learning/controlling the initial value of said working pressure, said learning/controlling means having a timer for counting a time ranging over start of the transition period between the fluid coupling state and the direct coupling state and substantial completion of the transition so as to control said initial value such that count time of said timer comes into a predetermined range.

3. An automatic transmission controller according to claim 2, wherein said working pressure control means further includes means for detecting a rotation speed difference between input and output of said torque converter and wherein said leaning/controlling means advances time counting of said timer when said rotation speed difference comes into a predetermined range, increases said initial value when the time count of said timer exceeds a predetermined upper limit value, and decreases said initial value when the time count of said timer falls below a predetermined lower limit value.

4. An automatic transmission controller for use with an automatic transmission which is provided with a torque converter having a fluid coupling unit for coupling driving force to a transmission through fluid coupling and a direct coupling unit for coupling the driving force to the transmission through mechanical coupling and being operative to take a fluid coupling state, a direct coupling state or an intermediate state between the fluid and direct coupling states in accordance with a working pressure applied to the direct coupling unit, comprising:

working pressure control means for generating a control signal which changes an initial value of said working pressure in accordance with said driving force during the period of transition between the fluid coupling state and the direct coupling state;

wherein said working pressure control means further includes means for changing said working pressure from its initial value in accordance with the lapse of time during said transition period, and means for decreasing the rate of change of the working pressure on the way, said working pressure changing means having means for determining the value of said working pressure by adding or subtracting a predetermined change quantity to or from a preceding value of working pressure each time that a command for transition between the fluid coupling state and the direct coupling state is generated.

5. An automatic transmission controller according to claim 4, wherein said working pressure control means further includes means for detecting a rotation speed difference between input and output of said torque converter and decreases the rate of change of said working pressure when said rotation speed difference comes into a predetermined range.

6. An automatic transmission controller for use with an automatic transmission which is provided with a torque converter having a fluid coupling unit for coupling driving force to a transmission through fluid coupling and a direct coupling unit for coupling the driving force to the transmission through mechanical coupling and being operative to take a fluid coupling state, a direct coupling state or an intermediate state between the fluid and direct coupling states in accordance with a working pressure applied to the direct coupling unit, comprising:

working pressure control means for generating a control signal which changes an initial value of said working pressure in accordance with said driving force during the period of transition between the fluid coupling state and the direct coupling state wherein said working pressure control means further includes means for determining coupling torque on the basis of a parameter containing an input rotation speed and an output rotation speed of said torque converter, and wherein said initial value is determined by subtracting a predetermined margin from a base value determined in accordance with the coupling torque.

7. A memory medium readable by a computer and storing a program for execution of a method of controlling an automatic transmission which is provided with a torque converter having a fluid coupling unit for coupling driving force to a transmission through fluid coupling driving force to a transmission through fluid coupling and a direct coupling unit for coupling the driving force to the transmission through mechanical coupling and being operative to take a fluid coupling state, a direct coupling state or an intermediate state between the fluid coupling state and the direct coupling state in accordance with a working pressure applied to the direct coupling unit, said program comprising a step of generating a control signal which changes the initial value of said working pressure in accordance with said driving force during the period to transition between the fluid coupling state and the direct coupling state wherein said program further comprises a step of changing said working pressure from its initial value in accordance with the lapse of time, and a step of decreasing the rate of change of the working pressure on the way wherein said program further comprises a step of fetching data of a rotation speed difference between input and output of said torque converter and a step of decreasing the rate of change of the working pressure when said rotation speed difference comes into a predetermined range.

8. A memory medium readable by a computer and storing a program for execution of a method of controlling an automatic transmission which is provided with a torque converter having a fluid coupling unit for coupling driving force to a transmission through fluid coupling driving force to a transmission through fluid coupling and a direct coupling unit for coupling the driving force to the transmission through mechanical coupling and being operative to take a fluid coupling state, a direct coupling state or an intermediate state between the fluid coupling state and the direct coupling state in accordance with a working pressure applied to the direct coupling unit, said program comprising a step of generating a control signal which changes the initial value of said working pressure in accordance with said driving force during the period to transition between the fluid coupling state and the direct coupling state wherein said program further comprises a step of learning/controlling the initial value of said working pressure and wherein said learning/controlling step includes a step of counting a time ranging over start of the transition period between the fluid coupling state and the direct coupling state and substantial completion of the transition and said program further comprises a step of controlling said initial value such that the count time comes into a predetermined range.

9. A memory medium readable by a computer and storing a program for execution of a method of controlling an automatic transmission which is provided with a torque converter having a fluid coupling unit for coupling driving force to a transmission through fluid coupling driving force to a transmission through fluid coupling and a direct coupling unit for coupling the driving force to the transmission through mechanical coupling and being operative to take a fluid coupling state, a direct coupling state or an intermediate state between the fluid coupling state and the direct coupling state in accordance with a working pressure applied to the direct coupling unit, said program comprising a step of generating a control signal which changes the initial value of said working pressure in accordance with said driving force during the period to transition between the fluid coupling state and the direct coupling state wherein said program further comprises a step of changing said working pressure from its initial value in accordance with the lapse of time, and a step of decreasing the rate of change of the working pressure on the way wherein said program further comprises a step of fetching data of a rotation speed difference between input and output of said torque converter, and wherein said learning/controlling step further includes a step of advancing the count time when said rotation speed difference comes into a predetermined range, a step of increasing said initial value when said time count exceeds a predetermined upper limit value and a step of decreasing said initial value when said time count falls below a predetermined lower limit value.

10. A memory medium readable by a computer and storing a program for execution of a method of controlling an automatic transmission which is provided with a torque converter having a fluid coupling unit for coupling driving force to a transmission through fluid coupling driving force to a transmission through fluid coupling and a direct coupling unit for coupling the driving force to the transmission through mechanical coupling and being operative to take a fluid coupling state, a direct coupling state or an intermediate state between the fluid coupling state and the direct coupling state in accordance with a working pressure applied to the direct coupling unit, said program comprising a step of generating a control signal which changes the initial value of said working pressure in accordance with said driving force during the period to transition between the fluid coupling state and the direct coupling state wherein said program further comprises a step of changing said working pressure from its initial value in accordance with the lapse of time and a step of decreasing the rate of change of the working pressure on the way, and wherein said working pressure change step includes a step of determining the value of said working pressure by adding or subtracting a predetermined change quantity to or from a preceding value of working pressure each time that a command for transition between the fluid coupling state and the direct coupling state is generated.

11. A memory medium according to claim 10, wherein said program further comprises a step of fetching data of a rotation speed difference between input and output of said torque converter and a step of decreasing the rate of change of said working pressure when said rotation speed difference comes into a predetermined range.

* * * * *